March 10, 1964  T. W. JUDD  3,123,999
APPARATUS FOR MEASURING SURFACE ROUGHNESS PEAKS
Filed May 13, 1960  4 Sheets-Sheet 2
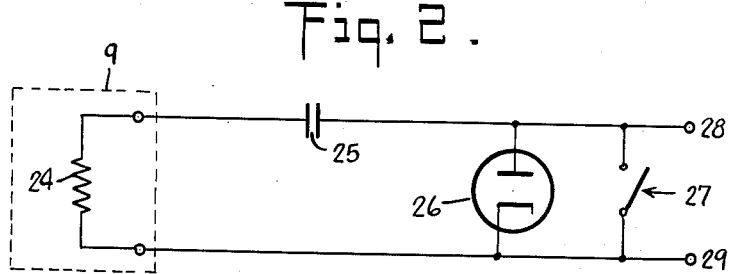
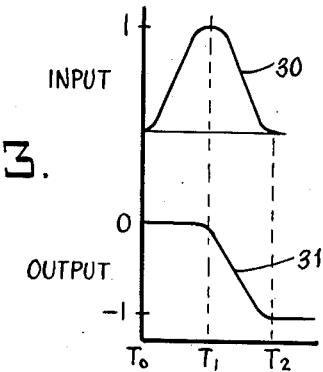
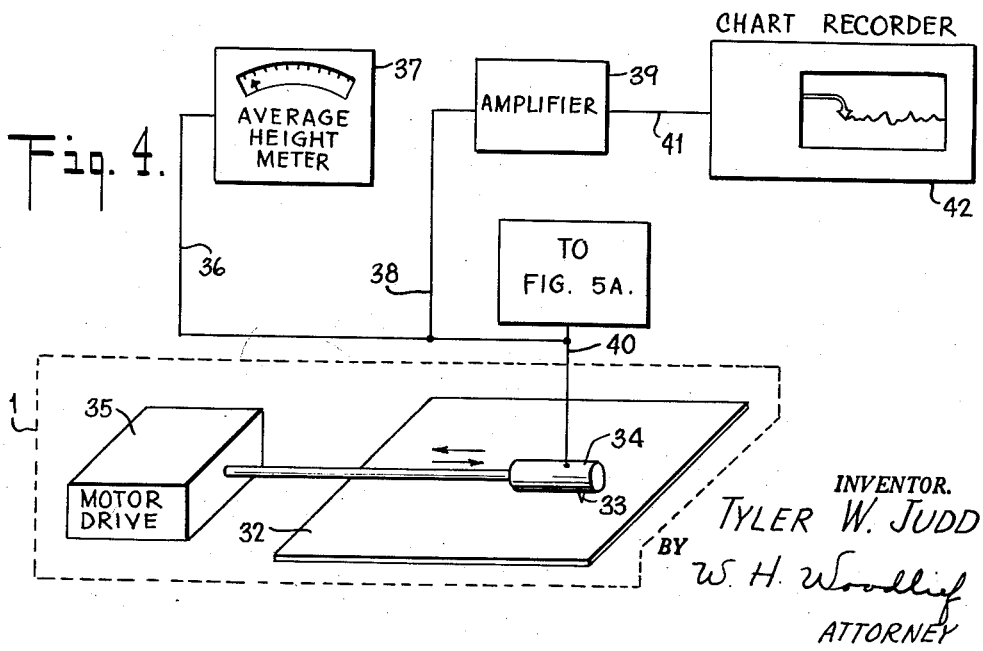
INVENTOR.
TYLER W. JUDD
BY W. H. Woolley
ATTORNEY

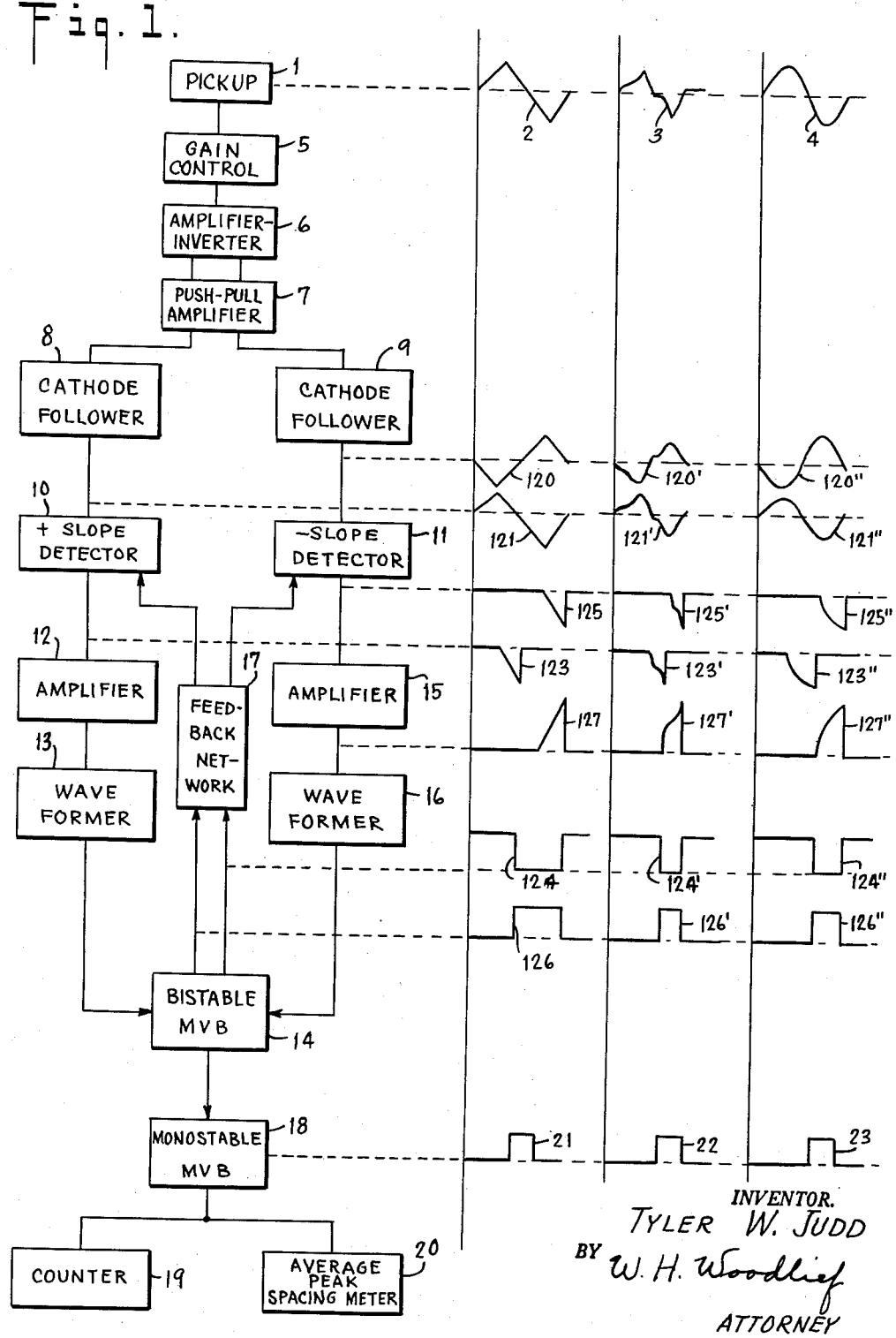

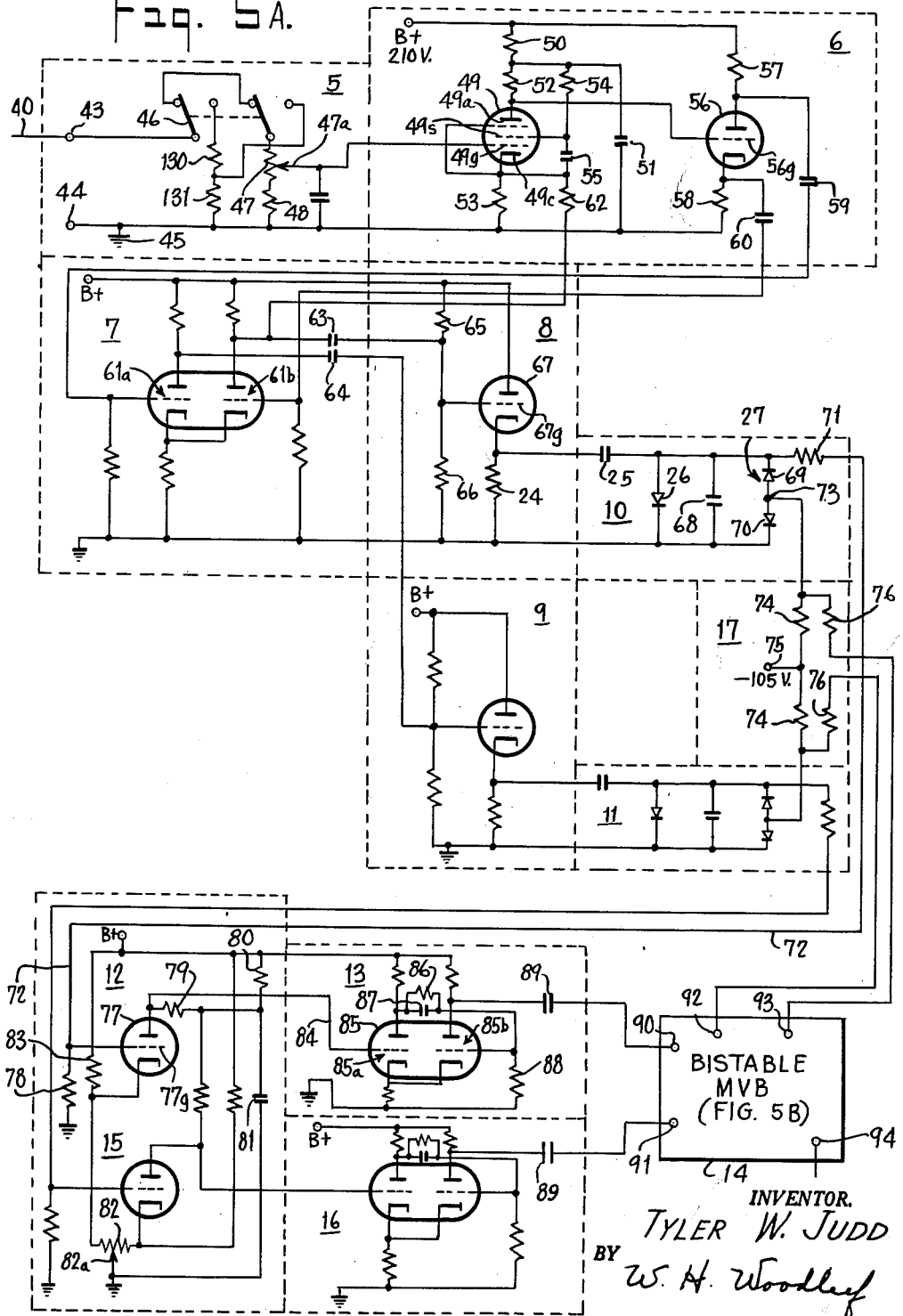

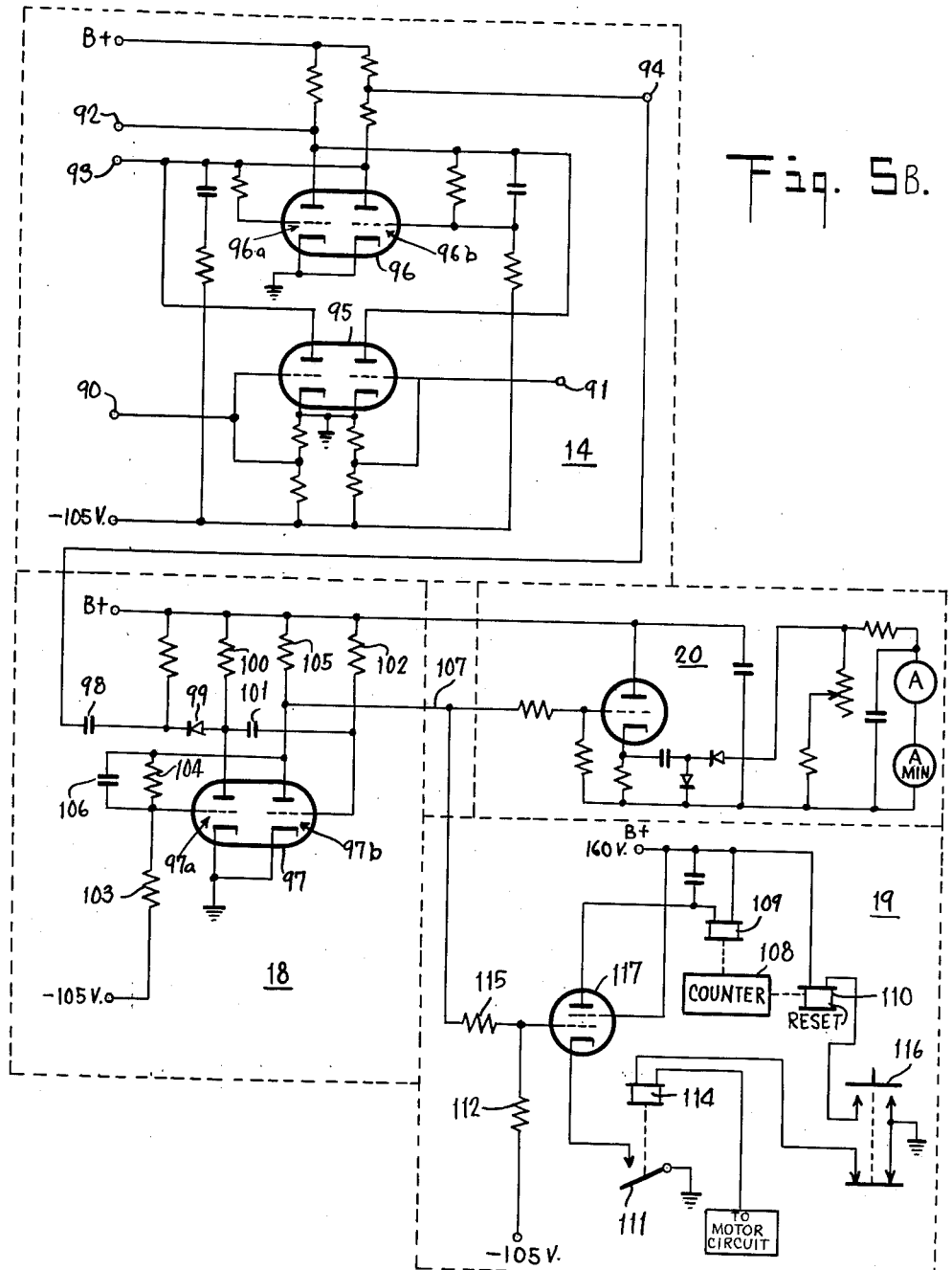

United States Patent Office 3,123,999
Patented Mar. 10, 1964

3,123,999
APPARATUS FOR MEASURING SURFACE ROUGHNESS PEAKS
Tyler W. Judd, Chardon, Ohio, assignor to Republic Steel Corporation, Cleveland, Ohio, a corporation of New Jersey
Filed May 13, 1960, Ser. No. 28,932
7 Claims. (Cl. 73—105)

This invention relates to apparatus for measuring surface roughness characteristics, and particularly to apparatus for measuring the number of roughness peaks per unit linear distance.

It has been the practice in the prior art to measure surface roughness by measuring the average height of the uneven peaks of the surface. This average height may be determined on either an arithmetic or R.M.S. basis. By height is meant distance in a direction perpendicular to the surface whose roughness is being measured.

It has been discovered that in many cases the average height technique for measuring roughness is not adequate to provide a basis for classifying material either as acceptable or unacceptable, particularly in the case of rolled steel sheets and strips having a matte finish. The roughness is supposed to give an indication of the suitability of the steel for certain further manufacturing operation, as for example drawing, or the applying of finish coats of metal (e.g., by plating), paint, enamel or the like. It has been found that in some instances the steel sheets would pass the established criterion as to roughness as measured by the average height, but would be turned down by the purchaser as not having adequate characteristics when it came to the later drawing or coating operations. The sheets might fail during drawing or the applied coatings might fail to stick.

There is disclosed in the copending application of W. C. Harmon, Serial No. 25,329, filed April 28, 1960 a method of rolling steel sheets in which the criterion of roughness employed is based on the number of roughness peaks per linear inch rather than on the average roughness height. The characteristic identified in the copending Harmon application as "peaks per inch" may be sometimes spoken of as "peaks per unit linear distance," or as "average peak spacing" or as the "horizontal component of roughness." It has been found that, with steel sheets, about 140 peaks per inch are usually needed to provide a matte finished sheet or strip having the required characteristics with respect to further treatment, e.g., plating, drawing and coating. For some uses, peak counts as low as 100 per inch are acceptable. About 200 peaks per inch provides a more desirable quality of steel in these respects, but steel whose roughness is within the 140 peak per inch limit is reasonably satisfactory.

The apparatus used for measuring average roughness height typically consists of a pick-up unit including a stylus having a fine point, e.g., a diamond, movable over the surface, and connected to a sensitive electronic transducer so as to vary an electrical current or potential in proportion to the changes in the surface contours. Since the contours involved are of the order of microinches (millionths of an inch), it is apparent that the stylus and transducer must be very sensitive. The transducer is commonly connected through an amplifier to suitable indicating or recording mechanism.

The recording mechanism may be used to trace an enlarged profile of the surface whose roughness is being measured. The indicating mechanism may be utilized to produce an indication of the average arithmetic height or the average deviation from a median plane. R.M.S. values are sometimes employed instead of arithmetic values. Some instruments have been proposed in which the meter readings are integrated so as to show the total deviation over a substantial distance.

Profile traces of the type just described may be used in the steel rolling method of the Harmon application mentioned above to provide a count of the roughness peaks per inch. Such peak counting methods are tedious and time consuming.

There is disclosed in the copending application of W. C. Harmon and T. W. Judd, Serial No. 27,363, filed May 6, 1960, an apparatus for counting roughness peaks which includes a stylus and transducer of the type described above, and means for differentiating the electrical potential produced by the transducer. The differentiating circuit produces an output pulse wherever the rate of change of slope of the profile trace is a maximum. In other words, output pulses are produced by the differentiating circuit at the sharpest points of the profile trace. Since the sharpest points may occur either at a peak or a valley, which is the desired condition, or may possibly occur as a ledge on the side of a peak, the circuit of the Harmon and Judd application is arranged to distinguish between true peaks and sharp ledges by counting only in response to a sequence of two output pulses of opposite polarity from the differentiating circuit which two output pulses normally are produced only by a peak followed by a valley in the surface.

It has now been discovered, as the result of further investigation, that the peak count produced by the differentiating type of apparatus disclosed in the Harmon and Judd application may not always provide an accurate criterion of the acceptability of the surface for further operations. One source of error in the differentiating type of apparatus is that certain contour sequences of ledges on the sides of peaks may simulate peaks and valleys sufficiently closely so that the differentiating circuit responds to them. Another and more common difficulty with the differentiating type of apparatus is that it does not respond to and count rounded peaks or rounded valleys. It has been found that the peaks are of considerably greater importance than the valleys as far as the suitability of the material for further manufacturing operations is concerned. The valleys may become substantially rounded or even flattened, due to wear of the mill roll which produces the matte surface. Nevertheless, if recognizable peaks remain of a sufficient density, the surface still remains suitable. The differentiating type of apparatus does not however register a count unless a relatively sharp peak is followed by a relatively sharp valley. It may therefore appear, as a result of a count with that type of apparatus, that the sheet material is unsuitable, whereas it is actually entirely satisfactory.

Furthermore, it has been discovered that the peaks themselves may be fairly well rounded on the top, and still not affect the suitability of the material for further operations, providing the peak itself has a substantial elevation. Again, the differentiating type of apparatus may not count a rounded peak.

It is therefore an object of the present invention to provide an improved apparatus for the measurement of surface roughness characteristics.

Another object is to provide apparatus for the counting of roughness peaks per unit linear distance, without reference to the sharpness of the peaks, and without reference as to whether the valleys between the peaks are sharp or rounded.

Another object of the invention is to provide surface roughness measuring apparatus which employs as a criterion of a peak a change of slope of the surface in one sense indicative of increasing deviation of the surface from a median value, followed by a variation of the profile in the opposite sense, indicative of a decreasing deviation of the surface from the datum value.

Another object of the present invention is to provide improved apparatus for analyzing an electrical potential varying with time so as to detect a variation of the amplitude of the potential in one sence followed by a variation thereof in the opposite sense.

A further object is to provide improved apparatus for detecting the change of an electrical potential in a predetermined sense.

The foregoing and other objects of the invention are attained in the apparatus described herein. In that apparatus, the electrical output potential from a stylus and a transducer of the type described above is fed to a gain control and thence to an amplifier and inverter stage having two outputs of opposite phase. These outputs drive a push-pull amplifier stage whose respective outputs are connected to the inputs of two separate cathode follower stages. The output of each cathode follower stage is connected to the input of a slope detector stage which is one of the essential features of the present invention. Each slope detector stage consists of a capacitor connected in series with a diode and with the output signal from the cathode follower stage. When that output signal is changing in one sense, the diode presents a high impedance to it, so that the signal does not charge the capacitor. When the signal changes in the opposite sense however, the diode presents a low impedance, and the signal is effective to charge the capacitor. A signal controlled by the charge on the capacitor is passed through an amplifier and a wave shaper stage and is fed to one of the two inputs of a bistable multivibrator. The other slope detector stage, fed by the other cathode follower, provides a similar signal for the other input of the bistable multivibrator.

When the input signal from the stylus and transducer is changing in one sense, one of the slope detectors provides an output signal to the bistable multivibrator and trips it to one of its stable states. When the slope of the input signal changes in the opposite sense, the other slope detector senses it and supplies a signal to trip the bistable multivibrator back to its opposite stable state. The bistable multivibrator therefore goes through a cycle of its two stable states each time that the slope of the input signal changes from a positive sense to a negative sense and back to a positive sense.

One output terminal of the bistable multivibrator is used to drive a monostable multivibrator, which in turn drives a counter circuit and an average peak spacing meter circuit. The two outputs of the bistable multivibrator also supply a feedback network connected to the slope detector circuits to discharge the capacitors thereof as soon as the signal on the capacitor has become effective to trip the multivibrator.

Other objects and advantages of the invention will become apparent from a consideration of the following specification and claims, taken together with the accompanying drawings.

In the drawings: FIG. 1 is a diagrammatic illustration of surface roughness measuring apparatus constructed in accordance with the invention, together with graphical illustrations of various surface profiles which may be encountered by the apparatus, and the electrical potentials produced in various parts of the apparatus by those surface roughness contours.

FIG. 2 is a wiring diagram of a simple circuit for detecting a variation in potential in a predetermined sense, according to a feature of the invention;

FIG. 3 is a graphical illustration of the variations of certain potentials in the circuit of FIG. 2;

FIG. 4 is a schematic illustration of a prior art mechanism which serves as the pickup unit indicated in FIG. 1; and FIGS. 5A and 5B, taken together, are a complete detailed wiring diagram of the apparatus shown schematically in FIG. 1.

Referring to FIG. 1, there is shown a pickup unit 1, illustrated in greater detail in FIG. 4, and which produces an electrical potential varying with time which serves as a trace of the profile of the surface whose roughness is being measured. The curves 2, 3 and 4 show three profile traces corresponding to typical situations which may be encountered. The curve 2 shows a sharp peak followed by a sharp valley. The curve 3 shows a sharp peak having sharp ledges on both sides of the peak and followed by a sharp valley. The curve 4 shows a rounded peak followed by a rounded valley. In all these three cases, it is desired that the apparatus count the section of profile trace shown in the drawing as one peak.

The signal from the pickup unt 1 is fed to a gain control 5 and thence to an amplifier-inverter stage 6 having complementary outputs which are in turn fed to a push-pull amplifier stage 7. The two outputs of the push-pull stage 7 are fed to two cathode follower circuits 8 and 9. The output of the cathode follower stage 8 is fed to a positive slope detector 10, and the output of the cathode follower 9 is fed to a negative slope detector 11. The output of slope detector 10 is fed through an amplifier 12 and a wave forming or squaring stage 13 to one input of a bistable multivibrator 14. The output of slope detector 11 is similarly fed through an amplifier 15 and a wave former 16 to the other input of the bistable multivibrator 14. The bistable multivibrator 14 has two feedback outputs connected through a feedback network generally indicated at 17 to the slope detector stages 10 and 11. One output of the multivibrator 14 is connected to the input of a monostable multivibrator 18, which produces one output pulse of predetermined shape and duration for each cycle of operation of the bistable multivibrator 14 through its two stable states. The output of monostable multivibrator 18 is connected to a mechanical counter 19 and to an average peak spacing meter 20.

Note that the apparatus responds to the three different wave forms indicated at 2, 3 and 4 by producing at the output of the multivibrator 18 three single pulses 21, 22 and 23, respectively, showing that the apparatus counts each of the profiles 2, 3 and 4 as one peak. The functioning of the various stages of the apparatus and the various intermediate potential variations illustrated in FIG. 1 are described below in connection with FIGS. 5A and 5B, where the detailed operation of the apparatus is set forth.

FIGS. 2 AND 3

FIG. 2 is a simplified wiring diagram of one of the slope detector stages 10 and 11, and FIG. 3 is a graphical illustration of the input and output potentials of the circuit of FIG. 2. For purposes of comparison, it is assumed that the slope detector shown in FIG. 2 is the slope detector 11 of FIG. 1 and of FIG. 5A. Corresponding elements in FIGS. 2 and 5A have been given the same reference numerals, although they may differ somewhat in structure. The functions of the corresponding elements are the same in the two figures, although the structures may be somewhat different.

The cathode follower stage 9 is shown in dotted lines in FIG. 2, and its output is taken across the load resistor 24. The output potential appearing across load resistor 24 is impressed on a simple series circuit including a capacitor 25 and a diode 26. A switch 27 is connected across the terminals of the diode 26, and output terminals 28 and 29 are connected to the anode and cathode of the diode 26, respectively.

Assume that a signal potential as shown at 30 in FIG. 3 appears across the load resistor 24 of the cathode follower 9. As long as this potential is positive going, as it is between time zero and time $T_1$ in FIG. 3, the diode 26 presents a very low impedance to it, capacitor 25 charges with its right hand terminal negative, and substantially no potential appears across the diode 26. The output potential between terminals 28 and 29 remains substantially zero, as shown in the curve 31 in FIG. 3, until time $T_1$.

As soon as the potential 30 reverses and becomes negative going, however, the diode 26 presents a high impedance to the flow of current, and the potential across resistor 24 then appears in series with the potential due to the charge on the capacitor, as indicated by the curve 31 between the times $T_1$ and $T_2$.

It may be seen from the foregoing that the circuit of FIG. 2 does not respond to a positive going input potential signal, but responds to a negative going input potential signal by producing an output signal between the terminals 28 and 29.

The switch 27 is provided to discharge the capacitor 25 so that the circuit may respond to a new input signal.

FIG. 4

This figure illustrates the pickup unit 1, including a mechanism which is used in the prior art to measure the average roughness height, and which may be utilized in cooperation with the apparatus of the present invention.

There is shown in FIG. 4 a sample 32 whose roughness is being measured. The measuring apparatus includes a stylus 33 forming part of a transducer 34 operated by a motor drive mechanism schematically indicated at 35. The transducer 34 sends an electrical signal through a wire 36 to an average height meter 37, through a wire 38 to an amplifier 39, and through a wire 40 to the input of the circuit of FIG. 5A. The amplifier 39 is shown as having an output wire 41 connected to a recorder 42 which draws an amplified profile of the surface being measured on a conventional recording chart.

Typical average height measuring mechanisms of the type described in this figure are shown in detail and described in the patent to Abbott, No. 2,240,278 and in the patent to Arndt, No. 2,460,726. Such mechanisms measure the average deviation of the surface profile from a median line.

In order to specify completely the roughness of a surface so that its practical qualities (e.g., drawing qualities and paint receiving qualities) may be definitely predicted, the specifications should include a limitation of the average roughness height, which is the quality measured by the Abbott and Arndt apparatuses, and should also include a specification of the total number of peaks over a specified distance (e.g., one inch) and a specification of the average peak recurrence frequency, with a limitation as to the minimum value of that average peak recurrence frequency. These latter quantities may be measured by the apparatus of FIGS. 5A and 5B.

FIGS. 5A AND 5B

The various stages and circuits illustrated in these figures are shown in schematic form in FIG. 1. Each stage in FIGS. 5A and 5B is enclosed in a dotted line. There appears within the dotted line enclosure an underlined reference numeral corresponding to the reference numeral applied to the corresponding box in FIG. 1.

The input signal comes from the transducer 34 (FIG. 4) through the wire 40 to input terminal 43. The co-operating input terminal 44 is grounded at 45. This input signal is fed through two fingers of a calibrating switch 46, a resistor 47 provided with a slider 47a, and a resistor 48 to ground at 45. The manually adjustable slider 47a adjusts the sensitivity of the counter so as to make it responsive to all peaks larger than a predetermined reference. Slider 47a is connected to the control grid 49g of a pentode 49, which may be a type 5879.

The pentode 49 forms part of an amplifier and an inverter stage 6. The anode circuit of the pentode 49 is supplied from B+ through a decoupling network comprising a resistor 50 and a capacitor 51. An anode load resistor 52 is connected between anode 49a and resistor 50. A cathode bias resistor 53 is connected between the cathode of pentode 49 and ground. The screen grid 49s is connected through a resistor 54 to the junction of resistors 50 and 52. A capacitor 55 by-passes the screen grid 49s. The cathode bias resistor 53 and the resistors 52 and 54 are chosen so that the potential of anode 49a is such as to permit direct coupling to the grid 56g of the inverter triode 56. The triode 56 may be one half of a type 12AU7 tube. The anode of triode 56 is connected to the B+ supply through a resistor 57. The cathode of triode 56 is connected to ground through a resistor 58. The resistors 57 and 58 are matched so that the signal potentials across them are equal in amplitude but opposite in phase. Complementary outputs are taken from the anode and cathode through coupling capacitors 59 and 60 to the inputs of the following push-pull amplifier stage 7.

The push-pull amplifier stage 7 is conventional, and includes a twin triode 61a, 61b, which may be a type 12AU7. A resistor 62 is connected between the anode of triode 61b and the cathode of pentode 49, and provides negative voltage feedback. This negative feedback stabilizes the gain and improves the frequency response of all the stages within the feedback loop.

The complementary outputs of the push-pull amplifier stage 7 are taken from the anodes of the two triodes 61a, 61b, and are fed through coupling capacitors 63 and 64 to the cathode follower stages 8 and 9. The stages 8 and 9 are similar in all respects and only one of them will be described in detail. A voltage divider comprising resistors 65 and 66 is connected in series between B+ and ground. The stage 8 includes a triode 67 which may be one half of a type 12AT7 tube. A load resistor 24 (see also FIG. 2) is connected between the cathode of triode 67 and ground. The input signal is coupled through capacitor 63 to the grid 67g of triode 67. The resistor 24 may be 24,000 ohms and provides the low output impedance required to drive the following slope detector stage 10.

The slope detector stages 10 and 11 are similar in all respects, and only the stage 10 will be described in detail. The principal parts of that stage and their functions have already been described in connection with FIG. 2. In addition to the elements shown in FIG. 2, the slope detector stage 10 has a capacitor 68 connected in parallel with the diode 26. In this connection, it should be noted that the main signal storing capacitor 25 may have a capacitance of about 0.02 mfd. The capacitor 68 on the other hand has a capacitance of about 0.002 mfd., and is used to shunt any high frequency transients which may be present.

The mechanically operated switch 27 shown in FIG. 2 is replaced in FIG. 5A by a functionally equivalent switching mechanism including two diodes 69 and 70 having their anodes connected together. The cathode of diode 69 is connected to the anode of diode 26, while the cathode of diode 70 is connected to ground. The common junction 73 of the diodes 69 and 70 is connected to the feedback network 17.

The signal potential appearing at the anode of diode 26 is transmitted through a resistor 71, which may be 10 megohms, and a wire 72 to the grid of the following amplifier stage 12.

The common junction 73 between the diodes 69 and 70 in each of the slope detector stages 10 and 11 is connected through a resistor 74 in the feedback and biasing network 17 to a source of negative potential indicated by a terminal 75, which may be 105 volts. The common terminal 73 is also connected through a resistor 76 in the feedback network to one of the two feedback output terminals 92 and 93 of the bistable multivibrator 14. The feedback potential from the multivibrator output terminals is effective at times to overcome the negative potential from source 75.

The potential from terminal 75 is normally effective to reverse bias both the diodes 69 and 70, so that the combination of those two diodes in series presents a high impedance to any charge on the capacitor 25 and thus substantially prevents discharge of that capacitor. When this negative potential at junction 73 is overcome by the feedback from the multivibrator 14, both the diodes 69 and 70 become forwardly biased, presenting a low impedance discharge path for the charge on capacitor 25.

The amplifier stages 12 and 15 are driven respectively by the slope detector stages 10 and 11, and are similar in all respects. Only the stage 12 will be described in some detail.

The stage 12 includes a triode 77 which may be one half of a type 12AT7. The grid 77g is grounded through a resistor 78, and receives an input signal through the wire 72. The high impedance resistor 71 which couples the slope detector stage 10 to the amplifier stage 12 raises the input impedance of the stage 12 to a point where its loading effect on the slope detector stage 10 is negligible. The anode of triode 77 is connected to B+ through a load resistor 79 and a decoupling network including a resistor 80 and a capacitor 81. The cathode of triode 77 is grounded through a balancing potentiometer 82 having a slider 82a connected to ground. The cathode of triode 77 is also connected to B+ through a resistor 83. Resistor 83 and resistor 82 form a voltage divider which establishes the proper grid bias for the triode 77. The slider 82a simultaneously and oppositely adjusts the bias on the two triodes 77 so as to permit precise balance between the two signal channels.

Each of the amplifier stages 12 and 15 drives one of the wave former or squaring circuits 13 and 16. The circuits 13 and 16 are similar in all respects, and only the circuit 13 will be described in some detail. The circuit 13 utilizes a twin triode 85 which may be a type 5965. The grid of triode 85a is directly coupled through wire 84 to the anode of triode 77 in the preceding stage 12. The anode of triode 85a is coupled to the grid of triode 85b through a parallel resistor 86 and a capacitor 87. The grid of triode 85b is also connected to ground through a resistor 88. The output of this stage is taken from the anode of triode 85b through a coupling capacitor 89.

The circuit 13 is a conventional cathode coupled bistable multivibrator or Schmitt circuit. The output consists of a positive step whenever the input signal exceeds a given level.

The bistable multivibrator 14 has two input terminals 90 and 91, two feedback output terminals 92 and 93, and a signal output terminal 94. The input terminals 90 and 91 are connected through the coupling capacitors 89 to the respective squaring circuits 13 and 16.

The input signals received at the terminals 90 and 91 are transmitted to the grids of a twin triode 95 which provides isolation of the multivibrator from the preceding stages, and also provides phase inversion of the input signals. The multivibrator 14 also includes a twin triode 96, which may be a type 5965, which is connected as a conventional bistable multivibrator. One triode of the twin triode 96 conducts heavily while the opposite triode is cut off. A trigger pulse applied to the grid of the conducting section cuts it off and turns the other triode on. The multivibrator thus has two stable states, in one of which triode 96a is on and triode 96b is off, while in the other state the triode 96b is on and the triode 96a is off.

The anodes of the triodes 96a and 96b are connected to the feedback terminals 92 and 93 respectively. The potential at the anode of the conducting triode is relatively low, while the potential at the anode of the cut-off triode is approximately equal to the B+ voltage. Consequently, the potential at the anode of the cut-off triode is fed back through one of the feedback output terminals 92 and 93 and one of the resistors 76 to one of the two slope detector stages 10 and 11, where it is effective to bias both the diodes 69 and 70 forwardly and to discharge the capacitor 25.

he monostable multivibrator 18 comprises two sections 97a and 97b of a twin triode 97, which may be a type 5965. Output pulses from the bistable multivibrator output terminal 94 are transmitted through a coupling capacitor 98 and a diode 99 to the anode of triode 97a. The anode of triode 97a is connected to B+ through a resistor 100 and to the grid of triode 97b through a capacitor 101. The grid of triode 97b is also connected to B+ through a resistor 102. The monostable multivibrator 18 provides a single output pulse which is constant as to amplitude, wave shape and duration in response to each input pulse. The input pulses may vary as to wave shape and duration. Triode 97b is normally conducting heavily in the absence of an input pulse. The triode 97a is held cut off by the voltage developed across the resistor 103, which forms part of a voltage divider including resistors 104 and 105 connected between B+ and a source of negative potential indicated as −105 volts. Since triode 97a is cut off, the potential at its anode is substantially equal to that of the B+ supply and the potentials at each end of the diode 99 are approximately equal. Under these conditions, the diode 99 can conduct incoming negative trigger pulses to the grid of triode 97b. As that grid swings negative in response to such an input pulse, triode 97b is cut off and a signal pulse is transferred through coupling resistor 106 and parallel capacitor 106 to the grid of triode 97a, turning triode 97a on and thereby reducing the potential at the anode of diode 99, reverse biasing that diode so that it blocks any further incoming signal as long as the triode 97b remains cut off. When the charge on capacitor 101 has dissipated through resistors 100 and 102, triode 97b begins to conduct again and the circuit returns to its normal state with triode 97b heavily conducting and triode 97a cut off. The output pulses of the monostable multivibrator 18 are positive square waves and are taken from the anode of triode 97b through a wire 107.

Output pulses appearing at wire 107 are transmitted to a counter circuit 19 and to a peak spacing meter circuit 20. Similar counter and average peak spacing meter circuits are shown in the copending application of Harmon and Judd, Serial No. 27,363, identified above.

The pulse counting circuit 19 includes a mechanical counter 108 which may have an operating winding 109 and a reset winding 110. The operating winding 109 is connected in series with the anode of a tetrode 117, which may be a type 6AQ5. A switch 111 is connected between the cathode of tube 117 and ground. The switch 111 is controlled by a relay 114, connected in the circuit of the motor which drives the stylus 33 across the sample 32. Tube 117 is normally biased to cut off by having its control grid connected through a resistor 112 to the −105 volts supply. When a positive pulse is applied to its grid from the monostable multivibrator 18, tube 117 conducts heavily, actuating the counter. A resistor 115 is connected in series with the grid to limit the grid current.

The reset coil 110 is energized by an obvious circuit controlled by a pushbutton switch 116. The switch 116 has second contact which controls a relay 114 to open the switch 111 while the counter 110 is being reset.

The metering circuit 20 is functionally the same as the average peak spacing meter disclosed at 24 in the copending Judd and Harmon application Serial No. 27,363, identified above.

*Operation*

Referring to FIG. 1, and particularly to the potential curves appearing below the input signal curve 2, it may be seen that the curves at the output of the cathode followers 8 and 9, which curves are identified by the numerals 121 and 120, respectively, are the same as the curve 2, except that curve 120 is inverted. The slope detector 10 responds to the positive slope of the input signal 2 and when its output signal reaches a value indicated at 123, it acts through amplifier 12 to trigger a wave former 13 effective to trip the bistable multivibrator 14 and switch the potentials at its output terminals as shown by the curves 124 and 126.

Thereafter, when the slope of the input signal 2 reverses and starts in a negative going phase, the negative slope detector 11 responds to this condition and produces an output pulse 125 which is effective to trip the multivibrator 14 back to its opposite condition. The monostable multivibrator 18 responds only to negative going output pulses from the bistable multivibrator 14. It therefore responds to the negative going portion of the curve 124 to produce a single output pulse 21. Note that the wave formers 13 and 16 are so constructed that they do not respond to the initial increasing output signal from the slope detectors 10 and 11, but only produce a sharp output pulse to the multivibrator 14 when the output from the slope detectors reaches a predetermined signal value, as described above.

Referring now to the curves appearing under the input signal 3 in FIG. 1, it may be seen that the ledges in the side of the peak do not cause any false output signals. Neither do they prevent the apparatus from accurately counting the peak. The potentials occurring in the circuit in response to the input signal 3 are shown by primed reference numerals in FIG. 1. Similarly, the potentials occurring in response to the input signal 4 are shown by double primed reference numerals corresponding to the reference numerals on the similar curves under the input signal 2.

When either slope detector circuit produces an output signal effective to trip the multivibrator, the multivibrator feeds back through the network 17, an output pulse effective to turn off the incoming slope detector signal, thereby preparing the slope detector circuit for the next input signal of the same phase.

It should be noted that the circuit described does not produce an erroneous count in response to a plurality of successive low peaks which are not sufficiently high to produce signals which will trip the multivibrator 14. While one such low peak charges the peak sensing capacitors, there are present at least two effects opposing the building up of such charges by a succession of low peaks.

One of these two effects is that the charge remaining after the first low peak opposes the incoming charge due to the next peak, so that the second in a series of peaks can only add to the charge an amount corresponding to the increase, if any, of the second peak height over the first peak height. There is thus no summation or integration of successive peaks.

The other effect is due to the leakage paths across the capacitors, which is continuously tending to discharge them, and which has a finite impedance, even though that impedance may be high when the diodes are reverse biased.

*Calibration*

Standards now in preparation define a peak for surface roughness purposes as the top of a vertical irregularity having a magnitude of 12.5 microinches average, or more, above a predetermined datum. Precision reference speciments having a 125 microinch average roughness are readily obtainable and are widely used for the calibration of surface roughness measuring instruments. These calibration blocks have a high degree of uniformity and accuracy and results obtained by their use are reproducible. Calibration of the apparatus disclosed herein is based upon the use of such blocks.

Since the potential produced by a transducer traversing a calibration block of the type just described is equivalent to 125 microinches, it follows that 1/10 of this potential is equivalent to 12.5 microinches. To calibrate the apparatus described, the switch 46 in FIG. 5A is thrown from the position shown in the drawing to the right hand position, thereby, connecting resistors 130 and 131 in the input circuit. Resistor 131 is in parallel with the series combination of resistors 47 and 48. This parallel combination in series with the resistor 130 form a voltage divider with a 10 to 1 ratio. A potential representing 125 microinches fed into the input terminal 43 produces a potential representing 12.5 microinches at the upper terminal of resistor 47. The slider 47a is then adjusted until the counter 19 just begins to function. The calibrating switch 71 is then returned to its normal operating position, as shown in the drawing.

While I have shown and described a preferred embodiment of my invention, other modifications will readily occur to those skilled in the art, and therefore intend my invention to be limited only by the appended claims.

I claim:

1. Apparatus for measuring the roughness of a surface, comprising a pick-up unit including a stylus movable relative to the surface and a transducer operatively connected to the stylus for producing an electrical signal varying in amplitude with the movements of the stylus perpendicular to the surface, and peak sensing means, including positive and negative slope detecting means, for detecting changes in the signal from amplitude variation in a sense indicative of increasing positive deviation of the surface contour from a datum to amplitude variation in the opposite sense.

2. Surface roughness measuring apparatus as defined in claim 1, in which the positive slope detecting means is responsive to a variation of the signal amplitude in said increasing deviation sense to produce a first output signal, the negative slope detecting means is responsive to a variation of the signal amplitude in said opposite sense to produce a second output signal, and indicator means responsive to sequential occurrence of said first and second output signals.

3. Apparatus for detecting a peak in an input electrical potential varying with time, comprising:
   (a) positive slope detecting means;
   (b) negative slope detecting means;
   (c) each said slope detecting means comprising a capacitor and a diode connected in series;
   (d) means to charge the capacitor of the positive slope detecting means in response to an input potential variation in a positive-going sense;
   (e) means to charge the capacitor of the negative slope detecting means in response to an input potential variation in a negative-going sense;
   (f) indicator means responsive to sequential charging of the two capacitors.

4. Peak detecting apparatus as defined in claim 3, including means responsive to the charging of each capacitor for discharging that capacitor.

5. Apparatus for measuring the roughness of a surface, comprising a pickup unit including a stylus movable relative to the surface and a transducer operatively connected to the stylus for producing an electrical signal varying in amplitude with the movement of the stylus perpendicular to the surface, and peak sensing means for detecting changes in the signal from amplitude variation in a sense indicative of increasing deviation of the surface contour from a datum to amplitude variation in a sense indicative of decreasing deviation of the surface contour from the datum, said peak sensing means comprising means responsive to a variation of the signal amplitude in said increasing deviation sense to produce a first output signal, means responsive to a variation of the signal amplitude in said decreasing deviation sense to produce second output signal, the first output signal producing means comprising a first capacitor and means to charge the first capacitor when the input signal amplitude varies in the increasing deviation sense, the second output signal producing means comprising a second capacitor and means to charge the second capacitor when the input signal amplitude varies in the decreasing deviation sense, means responsive to the charging of either capacitor to discharge that capacitor, and indicator means responsive to sequential occurrence of said first and second signals.

6. Surface roughnes measuring apparatus as defined in claim 5, comprising a bisable multivibrator having first and second inputs and first and second outputs, means for transmitting to the first and second inputs signals indicative of the charges on the first and second capacitors, respectively, switching means responsive to signals at the first and second outputs, respectively, for discharging the first and second capacitors, said indicator means being responsive to signals at one only of the outputs of the multivibrator.

7. Apparatus for detecting the change in an electrical signal from a condition of potential variation in a predetermined sense to a condition of potential variation in the opposite sense, including a capacitor and a diode connected in series with a source of said potential, said diode being poled to conduct current due to potential variation in the predetermined sense, so that said last-mentioned potential variation is effective to vary the charge on the capacitor in a corresponding sense, said capacitor and diode cooperating when said potential varies in the opposite sense to establish a substantial output signal potential of reverse polarity across the diode, indicating means responsive to said output signal potential, and means responsive to potential variation in the opposite sense to discharge the capacitor, said discharging means comprising second and third diodes connected in series opposition with each other, said series connected diodes being connected in shunt with the first mentioned diode, reverse biasing means connected to the common junction of the second and third diodes and tending to maintain both of the second and third diodes in a high impedance condition, and means responsive to the potential variation in the opposite sense for overcoming the reverse biasing means and sending current forwardly through the second and third diode so that they form a low impedance shunt for the first mentioned diode and hence a low impedance discharge path for the capacitor.

References Cited in the file of this patent
UNITED STATES PATENTS

| | | |
|---|---|---|
| 2,397,923 | Coss | Apr. 9, 1946 |
| 2,733,598 | Miner | Feb. 7, 1956 |
| 2,739,239 | Bernet | Mar. 20, 1956 |
| 2,774,535 | Anderson | Dec. 18, 1956 |
| 2,854,590 | Wolfe | Sept. 30, 1958 |
| 2,925,557 | Davis | Feb. 16, 1960 |
| 2,965,771 | Finkel | Dec. 20, 1960 |

OTHER REFERENCES

Zimmermann et al.: Electronic Circuit Theory, N.Y., John Wiley and Sons, Inc., 1959 (pages 117–121).